Figure 1:
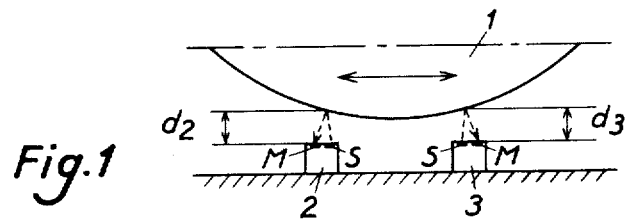

United States Patent [19]
Wester

[11] 3,886,361
[45] May 27, 1975

[54] DEVICE FOR CONTACTLESS POSITIONAL INDICATION
[75] Inventor: Kaj Dennis Georg Wester, Sodertalje, Sweden
[73] Assignee: Telefonaktiebolaget L M Ericsson, Stockholm, Sweden
[22] Filed: Oct. 19, 1973
[21] Appl. No.: 408,158

[30] Foreign Application Priority Data
Oct. 26, 1972 Sweden............................ 13838/72

[52] U.S. Cl............ 250/338; 250/231 GY; 250/353
[51] Int. Cl. ............................................. G01d 5/34
[58] Field of Search ........... 250/338, 341, 347, 353, 250/231 GY

[56] References Cited
UNITED STATES PATENTS
3,270,567  9/1966  Crampton................ 250/231 GY X
3,283,409  11/1966 Rothe et al. ................ 250/231 GY
3,328,595  6/1967  Todd, Jr....................... 250/231 GY
3,544,988  12/1970 Astheimer....................... 250/353 X
3,769,514  10/1973 Clark, Jr. ............................ 250/341

Primary Examiner—Archie R. Borchelt
Attorney, Agent, or Firm—Hane, Baxley & Spiecens

[57]  ABSTRACT

A device for contactless indication of the positional changes in one or more planes relative to a reference plane of a moving body comprising a reflecting, preferably spherical, surface towards which the electromagnetic radiation of at least one transmitter is directed includes at least two receivers sensitive to electromagnetic radiation which are differentially arranged in pairs in relation to the reflecting surface in order to receive the reflected radiation and convert it into electrical quantities for comparison in an amplifier in such a manner that the resulting output signal corresponds to the movement of the body.

5 Claims, 3 Drawing Figures

DEVICE FOR CONTACTLESS POSITIONAL INDICATION

This invention relates to a device for contactless indication of the positional changes of a body in one or more planes relative to a reference plane through the generation of electrical quantities representative of the changes.

Devices for indication of positional changes come into use within many fields. The invention is judged to be of particular interest for the manual control of remote-controlled projectiles with a control stick and for control of synthetic markers on visual displays of different types.

Indicating devices of the aforesaid type are usually constructed in such a way that the positional changes in the various planes are transferred mechanically to potentiometers wherein the positional changes giving rise to corresponding changes of resistance. Even if the potentiometers used are of high quality, problems arise with contact noise and with changes in the potentiometers owing to wear and aging. Another disadvantage of the potentiometer types of indicator is their comparatively great inertia.

To avoid the problems occurring through the use of moving electrical contacts in combination with mechanical transmission, various types of contactless magnetic indication devices have been designed. In the case of control sticks, for example, differential transformers have come into use. In one embodiment of such a control stick the yoke of a differential transformer is placed directly on the control stick and the relative position of the yoke is indicated by the phase and amplitude of an alternating voltage.

When using differential transformers great care must be devoted to the design and manufacture of the transformer. A comparatively large number of electronic circuits are also required, among which are phase detectors for the conversion and filtering of the transmitting signal. A complete equipment for positional indication with differential transformers is consequently fairly expensive and complicated.

An object of the present invention is to provide a device for contactless positional indication which eliminates the aforesaid disadvantages and at the same time permits a large measure of miniaturization compared with earlier known transmitting means. This is achieved through the characteristics of the device set out in the following claims.

Figure 2:
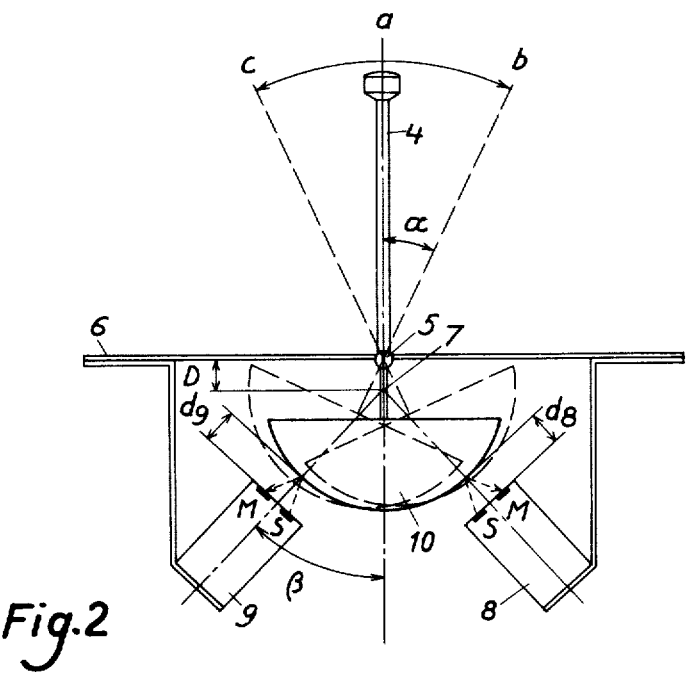

The invention will be explained with reference to the accompanying drawing, in which FIG. 1 shows the principle for positional indication according to the invention, FIG. 2 shows an example of an embodiment of a control stick according to the invention, and FIG. 3 an shows alternative form of the transmitter and receiver arrangement for a control stick.

In FIG. 1, which shows the principle for positional indication according to the invention, 1 denotes part of a body which comprises a diffusely reflecting cylindrical surface and which can perform linear movements in the direction of the arrow. Numerals 2 and 3 denote fixed sensing devices, each comprising a transmitter S and a receiver M. The transmitters S can appropriately be made of infrared-emitting semiconductor diodes, while each of the receivers M can comprise a light-sensitive semiconductor diode or transistor. The path of radiation between the transmitters, the reflecting surface and receivers is shown by dotted lines. The two receivers are differentially coupled to an amplifier, not shown, with high suppression of cophasal signals, so that the resulting output signal reproduces solely a difference voltage.

Provided that the sensing devices 2 and 3 have identical properties and that the energy irradiated from the transmitters is constant, the actuation of the respective receivers will depend chiefly on the distance d of the receivers in the radiation path. In FIG. 1 the moving body 1 is shown in a position where the distances $d_2$ and $d_3$ are equal. On a displacement of the moving body to the left the distance $d_2$ diminishes whereas the distance $d_3$ increases. This implies an increased illumination of the receiver in the sensing device 2, and consequently increased output voltage. The receiver in the sensing device 3, on the other hand, is less illuminated and therefore delivers a lower output voltage.

In FIG. 2, which shows an embodiment of a control stick according to the invention, 4 denotes the actual stick which at fulcrum 5 is movably attached in a reference plane 6. The projecting part of the control stick below the reference plane 6 is rigidly attached to a spherical segment 10, the spherical surface of which is homogeneous and diffusely reflecting. The spherical segment being so arranged that its centre 7 is at a given distance D from the fulcrum 5 of the control stick. Two sensing devices 8 and 9, each comprising a transmitter S and a receiver M, are fixed in relation to the reference plane 6 and directed towards the centre 7 of the segment, so forming an angle to the normal of the reference plane through the fulcrum 5 of the stick. The sensing devices are at a distance $d$ from the spherical surface of the segment. Each receiver receives part of the radiation from its associated transmitter which is reflected by the spherical surface of the segment.

In FIG. 2 the stick 4 occupies a position $a$, the zero position, in which the distances $d_8$ and $d_9$ between the two sensing devices and the surface of the segment are equal and accordingly the actuation of the respective receivers is equal. Other positions, $b$ and $c$ for the stick and segment are indicated by dotted lines. In position $b$ distance $d_9 <$ distance $d_8$, and consequently the actuation of the receiver in the device 9, is greater than the actuation of the receiver in the device 8. With the stick in position $c$ the situation is reversed. As mentioned with reference to FIG. 1, the receivers are in differential coupling with an amplifier, not shown, with high suppression of cophasal signals so that the resulting output signal reproduces solely the difference voltage. For a given relation between the parameters D, $d$ and $\beta$ the difference voltage will be very nearly linearly proportional to the stick angle $\alpha$ of the stick. The transfer function can be varied within relatively wide limits by a change of the said parameters and by a change of the form of the reflecting surface.

By introducing a second pair of sensing devices situated in a plane perpendicular to the reference plane 6 and the plane through the first pair of sensing devices 8 and 9 a positional change caused by a stick movement in another coordinate can be indicated. For stick movements in other planes perpendicular to the reference plane the components of the movement in the two coordinates will be registered.

Owing to the differential coupling of the sensing devices to a subsequent amplifier cophasal disturbances, for example such as are caused by varying operative temperature, will be eliminated. Nor will movements of reflector and control stick along the extension of the control stick affect the output signal. Owing to this suppression of the signal, the fulcrum point 5 can consist of a rubber diaphragm of suitable form in cases when automatic resetting of the stick is desired.

Figure 3:
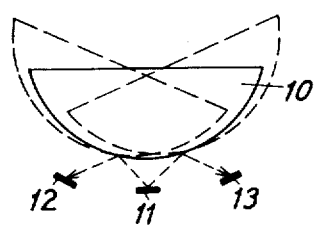

FIG. 3 shows an alternative embodiment of the transmitter-receiver arrangement for a control stick. 10 denotes a segment attached to a stick, not shown, and, as in FIG. 2, the outline of the segment is indicated by dotted lines in two other positions which the segment may assume. Numeral 11 denotes a centrally placed transmitter the radiation of which, reflected by the segment, is received by receivers 12 and 13. Other receivers can be placed in a plane perpendicular to the reference plane, not shown, and to the plane through receivers 12 and 13. By proceeding in this manner or by dividing up and directing the radiation from the transmitter to points close to the receivers, the number of transmitters can be reduced.

Control sticks constructed in accordance with the invention are very favourable from the cost aspect owing to their mechanical simplicity. They are also advantageous in view of the fact that the signal-to-noise ratio is high, since noise arises solely from semiconductors in the sensing devices and from the amplifier.

I claim:

1. Apparatus for indicating the change in the position of a moving body in at least a first plane relative to a reference plane comprising a reflective surface on the body, at least one transmitter of electromagnetic radiation, said transmitter being fixed relative to said reference plane for directing radiation in said first plane to said reflecting surface and two receivers of electromagnetic radiation, each of said receivers including means for generating electrical signals having values related to the intensity of the received radiation, said receivers being fixed relative to said reference plane and positioned to receive radiation reflected from said reflective surface, said receivers being positioned with respect to said reflective surface such that the distances between said receivers and said reflective surface differentially change for translational movements of the body in said first plane whereby such movement of the body in the first plane increases the value of the electrical signal generated by the generating means of one receiver while decreasing the value of the electrical signal generated by the generating means of the other receiver.

2. The apparatus of claim 1 wherein said reflective surface on the body has a surface contour such that the intersection of said first plane and the reflective surface defines the segment of a circle and said receivers lie in said first plane and are positioned such that the respective distances between said receivers and the segment of a circle differentially change for translational movements of the body in said first plane.

3. The apparatus of claim 2 further comprising means for pivotally mounting the body at a point which is eccentric to the segment of a circle so that any rotation of the body about said point includes a component of translational movement of the reflective surface in said first plane.

4. The apparatus of claim 3 wherein the reflective surface is the segment of a sphere and said point is eccentric to the center of the sphere.

5. The apparatus of claim 4 further comprising two further receivers positioned in a second plane orthogonal to said reference and first planes.

* * * * *